United States Patent
Yoshifusa et al.

(10) Patent No.: US 6,277,275 B1
(45) Date of Patent: Aug. 21, 2001

(54) APPARATUS FOR MAGNETIC TREATMENT OF FLUID

(75) Inventors: Katsutoshi Yoshifusa, 22456 Bywater Rd., Lake Forest, CA (US) 92630; Yutaka Matsuura, Rancho Palos Verdes, CA (US)

(73) Assignees: Sumitomo Special Metals Co., Ltd., Osaka (JP); Katsutoshi Yoshifusa, Lake Forest, CA (US)

( * ) Notice: Subject to any disclaimer, the term of this patent is extended or adjusted under 35 U.S.C. 154(b) by 0 days.

(21) Appl. No.: 09/432,185

(22) Filed: Nov. 2, 1999

(51) Int. Cl.[7] .................................................. B01D 35/06
(52) U.S. Cl. ........................................... 210/222; 210/232
(58) Field of Search .................................. 210/222, 695, 210/232

(56) References Cited

U.S. PATENT DOCUMENTS

| | | | |
|---|---|---|---|
| 4,188,296 | * 2/1980 | Fujita et al. | 210/222 |
| 4,190,540 | * 2/1980 | Spodig | 210/222 |
| 4,367,143 | * 1/1983 | Carpenter | 210/222 |
| 4,601,823 | * 7/1986 | Beck | 210/222 |
| 4,605,498 | * 8/1986 | Kulish | 210/222 |
| 5,037,546 | * 8/1991 | Janczak et al. | 210/222 |
| 5,055,189 | * 10/1991 | Ito | 210/222 |
| 5,269,916 | * 12/1993 | Clair | 210/222 |
| 5,466,574 | * 11/1995 | Liberti et al. | 435/5 |
| 6,068,768 | * 5/2000 | Carpenter | 210/222 |

* cited by examiner

Primary Examiner—John Kim
(74) Attorney, Agent, or Firm—Armstrong, Westerman, Hattori, McLeland & Naughton, LLP

(57) ABSTRACT

A magnetism applying circuit, which has a construction in which the different polarity ends of a pair of permanent magnets are connected to the respective ends of a yoke having a V-letter shape, is attached to a pipe so as to place the permanent magnets close to the pipe. Therefore, a magnetic fluid treatment apparatus which can reduce magnetic field leakage is formed.

17 Claims, 8 Drawing Sheets

APPARATUS FOR MAGNETIC TREATMENT OF FLUID

BACKGROUND OF THE INVENTION

1. Field of the Invention

The present invention relates to an apparatus for carrying out a magnetic treatment on a fluid, and more articularly concerns, for example, a magnetic fluid treatment apparatus that is attached on the periphery of a later supply pipe so as to carry out a magnetic treatment on supply water flowing through the pipe.

2. Description of the Related Art

It has been conventionally known that the application of a magnetic field to flowing water in a direction crossing to the flow holds a mineral component quantity in water and stabilizes ions such as chlorine and calcium, etc., so that the ions do not combine with organic substances, and removes scale and sludge, etc., which have been already formed. This is supposedly because when water is subjected to the magnetic treatment, clusters, that is, a mass of water molecules, change in their structure and consequently have a change in their characteristics. FIG. 1 is a cross-sectional view showing the construction of a conventional magnetic fluid treatment apparatus that is attached to a water supply pipe so as to be used. In the Figure, W represents a water supply pipe made of iron, and two magnetism applying devices 5 are placed adjacent to each other on the peripheral face of the water supply pipe W, with the water supply pipe sandwiched in between. Supply water flowing through the water supply pipe W is subjected to the magnetic treatment by a magnetic field exerted by the magnetism applying devices 5.

Because the two magnetism applying devices S have the same construction, the following description will discuss only one of the magnetism applying devices 5, for convenience of explanation. The magnetism applying device 5 is provided with a permanent magnet 50 having a substantially rectangular parallelepiped shape and two permeable rods 51 made of iron that are in upright positions on both sides in the length direction of the permanent magnet 50. The two permeable rods 51 are extended substantially in parallel with each other, and the distance between the top faces 52 thereof is shorter than the diameter of the water supply pipe W. Each of the top faces 52 is tilted with an angle so as to properly face the peripheral face of the water supply pipe W. The two magnetism applying devices 5 having the above-mentioned construction are placed face-to-face with each other with the water supply pipe W to be magnetically treated being sandwiched in between, and the total four top faces 52 of the permeable rods 51 are placed in the proximity of the peripheral face of the water supply pipe W, and secured on the water supply pipe W with fastening members, not shown.

In the magnetic fluid treatment apparatus having the above-mentioned construction, a magnetic flux generated from the N polarity side of the permanent magnet 50 passes through one permeable rod 51 and is released from the top face 52 so that the magnetic flux supplied to the water supply pipe W is exerted on water flowing through the water supply pipe W (see arrows indicated by solid lines). The magnetic flux progressing forward in the water supply pipe W proceeds to the top face 52 of the other permeable rode 51, and returns to the S polarity side of the permanent magnet 50 through the permeable rod 51. In this path, while the magnetic flux progresses between the top faces 52 of the permeable rods 51, some of the magnetic flux passes through the outer circumferential side of the water supply pipe W without passing through the inner circumferential side of the water supply pipe W, or flows from a midpoint of one of the permeable rods 51 toward the other permeable rod 51, or progresses through a space from the N polarity side of the permanent magnet 50 to the S polarity side thereof without passing through the permeable rod 51 (indicated by white void arrows in the Figure); consequently, so-called magnetic field leakage occurs.

This magnetic field leakage accounts for a great ratio to the magnetic force of the permanent magnet, and even when a permanent magnet having 100,000 Maxwell of the total number of magnetic flux is used, the magnetic force exerted on the water is as small as 1700 gauss to 1900 gauss; and even in the case of a water supply pipe made of brass, it is in the range of approximately 2300 gauss to 2400 gauss. The resulting problem is that it is not possible to apply a sufficient magnetic force to the water. Moreover, in order to insure a sufficient magnetic force (2500 gauss to 4000 gauss) required for a magnetic treatment, the application of a permanent magnet having a great magnetic force is required; this makes the apparatus bulky, resulting in a problem of limited installation place and difficulty in the installation. Furthermore, when the magnetic field leakage is very great, the apparatus cannot be installed in the proximity of the meter, and this also results in a problem of limitation in the installation positions. In addition, because the magnetism applying devices, which are placed face-to-face with the water supply pipe W sandwiched in between, are provided as separate parts, the installation work of these devices involves difficult work with an extra piping job, resulting in a problem of time-consuming tasks.

BRIEF SUMMARY OF THE INVENTION

The present invention has been devised to solve the above-mentioned problems, and one of the objectives of the present invention is to provide a magnetic fluid treatment apparatus which can reduce magnetic field leakage.

A magnetic fluid treatment apparatus comprises: at least a pair of magnetism generating members being placed on the periphery of a pipe, with the pair of magnetism generating members having their different magnetic polarity ends placed close to the pipe; and a yoke having permeability that has ends to which the pair of magnetism generating members are connected.

In the present invention, the pair of magnetism generating members, such as permanent magnets, are placed close to a pipe, such as a water supply pipe. The paired permanent magnets have their different polarity sides aligned face-to-face with the pipe; therefore, a magnetic flux generated from the N polarity side of one of the permanent magnets passes through the pipe, and is allowed to enter the S polarity side of the other permanent magnet. The magnetic flux that has entered the S polarity side is allowed to return to the original permanent magnet through the yoke. Here, because the yoke is not divided, it is possible to reduce magnetic flux leakage due to short-cut from the yoke. Moreover, magnetic flux leakage from the permanent magnet to the outside of the pipe can be reduced. Thus, because the magnetic field leakage can be greatly reduced, the magnetic force that the permanent magnet possesses can be exerted on the fluid without losses, the apparatus can be miniaturized, and the apparatus can be attached even in the proximity of a meter.

Another objective of the present invention is to provide a magnetic fluid treatment apparatus which, upon removing the two magnetism applying circuits that are aligned opposite each other with the pipe sandwiched in between, makes it possible to remove the devices easily by utilizing a magnetic repulsive force.

Another magnetic fluid treatment apparatus in accordance with the present invention has the two magnetism applying circuits aligned face-to-face with each other, each of the magnetism applying circuits is provided with at least a pair of magnetism generating members being placed on the periphery of a pipe, with the pair of magnetism generating members having their different magnetic polarity ends placed close to the pipe; and a yoke having permeability that has ends to which the pair of magnetism generating members are connected, wherein the two magnetism applying circuits are aligned face-to-face with each other with the pipe sandwiched in between so that the both magnetism generating members have their same magnetic polarity sides located close to each other.

Moreover, still another magnetic fluid treatment apparatus in accordance with the present invention has the two magnetism applying circuits aligned face-to-face with each other, each of the magnetism applying circuits is provided with a yoke having permeability that has a substantially V-letter shape, and a pair of magnetism generating members having their different magnetic polarity faces connected to the respective ends of the yoke, wherein the two magnetism applying circuits are aligned face-to-face with each other so that the magnetism generating members are located inside thereof with the same magnetic polarity sides of the both magnetism generating members being positioned close to each other.

In the present invention, the pair of magnetism generating members, such as permanent magnets, are placed close to the pipe. Moreover, the two magnetism applying circuits are provided in which a magnetic flux generated from one of the permanent magnets passes through the pipe and is allowed to flow through the other permanent magnet and return to the original permanent magnet through the yoke, and these are aligned face-to-face with each other with the pipe sandwiched in between. This arrangement greatly reduces magnetic field leakage. Moreover, since the two magnetism applying circuits are aligned face-to-face with each other so that the permanent magnets of the two magnetism applying circuits are placed with the same polarity sides thereof being positioned close to each other, a magnetic repulsive force is exerted between the opposing magnetism applying circuits; consequently, it is possible to remove the apparatus more easily.

Still another objective of the present invention is to provide a magnetic fluid treatment apparatus which engages the two magnetism applying circuits by a simple job, allows the magnetism applying circuits to be attached and detached with their coupled state, and is adjustable so as to be applied to pipes with different diameter dimensions.

Still another magnetic fluid treatment apparatus comprising a first engaging portion for engaging the two magnetism applying circuits at respective ends on one side and a second engaging portion for engaging the two magnetism applying circuits at respective ends on the other side.

In the present invention, because the two magnetism applying circuits are engaged at respective ends on one side and at respective ends on the other side, they can be engaged by a simple process such as thread engagement; thus, it is possible to easily attach them to the pipe.

Moreover, in the present invention, the first and second engaging portion have a construction that allows adjustments for the facing distance between the magnetism applying circuits, that is, for example, a construction having elongated holes formed in the facing direction of the magnetism applying circuits. Therefore, in a state where the engaging plates are attached to the magnetism applying circuits with screws being inserted through the elongated holes, when the two magnetism applying circuits are away separated each other, the screws are allowed to slide on the elongated holes so that the facing distance between the magnetism applying circuits can be adjusted to a desired distance. Consequently, it is possible to adjust the facing distance of the magnetism applying circuits in accordance with the diameter of the pipe.

Moreover, in the present invention, the first engaging portion may have the construction for adjusting the facing distance of the magnetism applying circuits as described above, while the second engaging portion may have such a construction that it is allowed to be removed from one of the magnetism applying circuit, such as, for example, a construction in which the elongated hole has a cutout at its end in the facing direction of the magnetism applying circuit. Therefore, since the facing distance of the magnetism applying circuits can be adjusted to a predetermined distance as described above, and since the second engaging portion can be removed from one of the magnetism applying circuit, the apparatus can be attached to the pipe from the side with the second engaging potion that has been removed, with the result that the apparatus can be attached and detached to the pipe with the two magnetism applying circuits being coupled to each other.

Furthermore, in the present invention, permanent magnets having different dimensions may be used. With this arrangement, the distance between the magnetism applying circuits is adjusted in accordance with the size of the diameter of the pipe so that it becomes possible to attach the apparatus even to a pipe with a small diameter.

The above and further objects and features of the invention will more fully be apparent from the following detailed description with accompanying drawings.

BRIEF DESCRIPTIONS OF THE SEVERAL VIEWS OF THE DRAWINGS

DETAILED DESCRIPTION OF THE INVENTION

Figure 1:
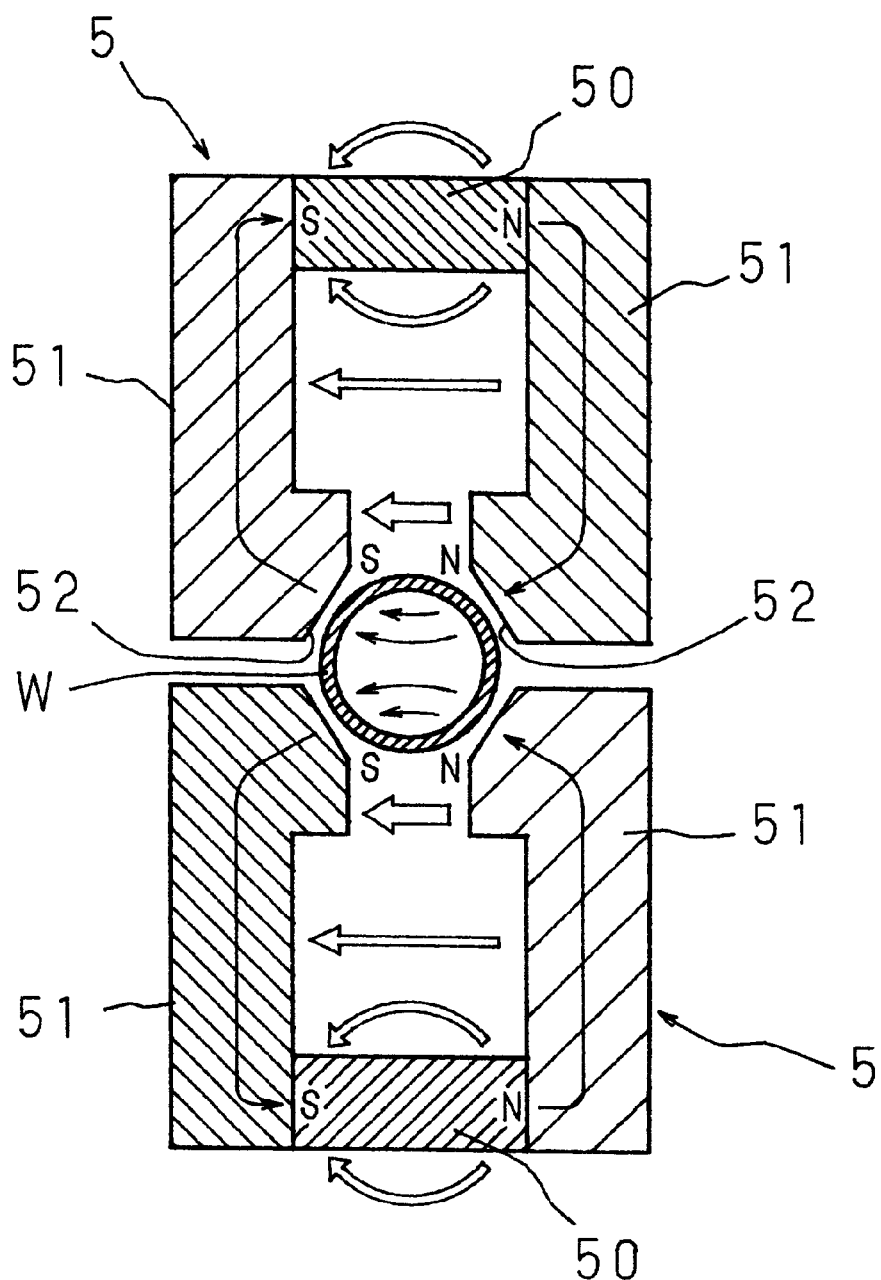
FIG. 1 is a cross-sectional view that shows the construction of a conventional magnetic fluid treatment apparatus.

Referring to the drawings, the following description will discuss various embodiments of the present invention.

Figure 2:
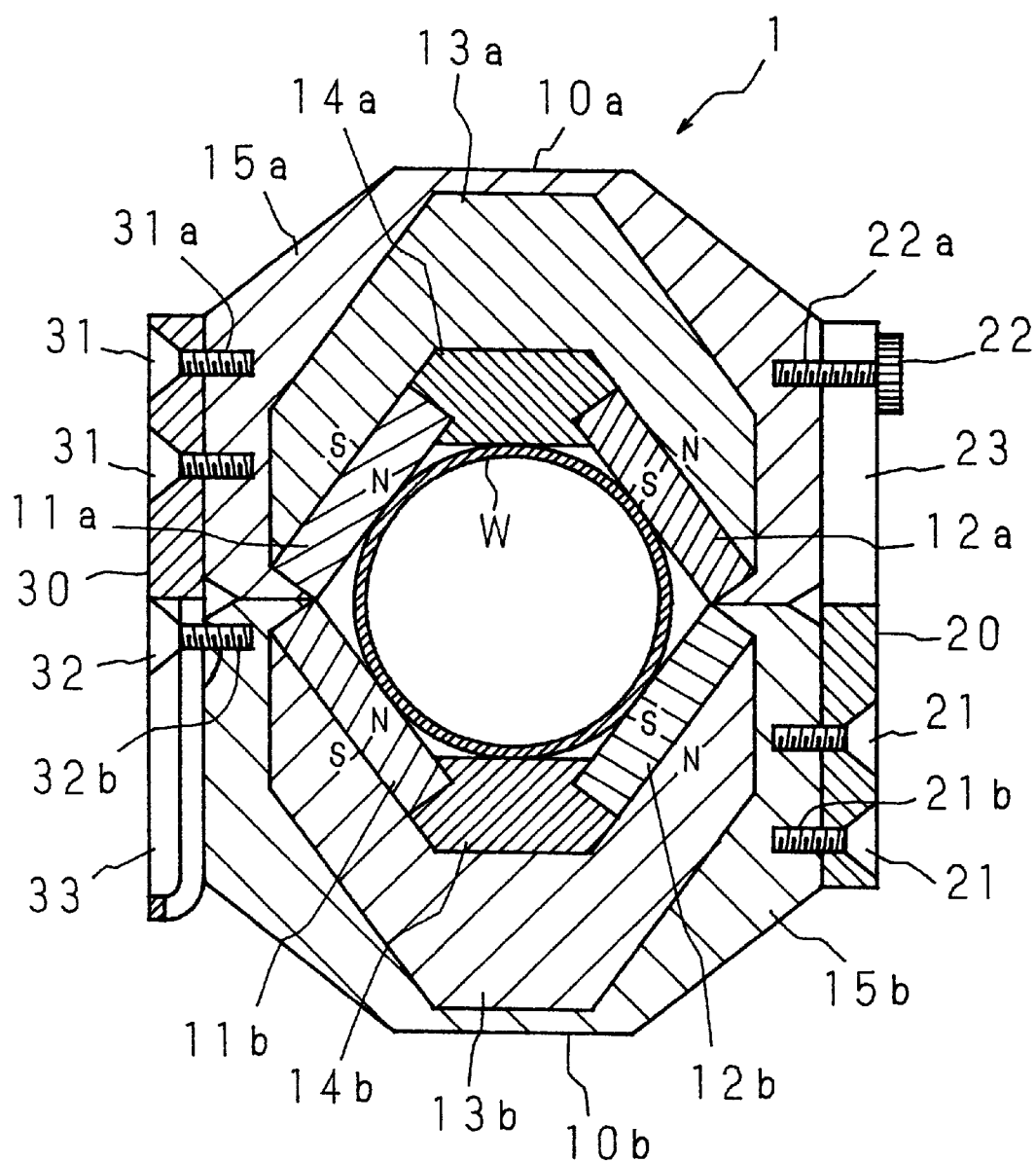
FIG. 2 is a cross-sectional view that shows the construction of a magnetic fluid treatment apparatus in accordance with the first embodiment of the present invention.

FIG. 2 is a cross-sectional view of the first embodiment of the present invention showing the construction of a magnetic fluid treatment apparatus. FIG. 2 shows the lateral cross-section of a water supply pipe W made of iron in the center, and indicates a state in which a fluid treatment apparatus 1 is attached on the peripheral face of the water supply pipe W. The fluid treatment apparatus 1 is provided with two magnetism applying circuit units 10a and 10b, an opening engaging plate 20, and a sliding engaging plate 30. The two magnetism applying circuit units 10a and 10b, which are aligned face-to-face with each other, have the same construction; therefore, an explanation will be given only of one of the magnetism applying circuit units 10a, and an explanation of the other magnetism applying circuit unit 10b is omitted.

A pair of permanent magnets 11a and 11b are attached to the respective ends of a yoke 13a made of iron, having a V-letter shape on the plain view, and a spacer 14a, made of synthetic resin or aluminum, is embedded in a space formed by the inner side of the yoke 13a and the permanent magnets 11a and 12a. These parts are housed inside a housing 15a formed of aluminum or a non-permeable material,and only the inner surface on which the permanent magnet 11a, the spacer 14a and the permanent magnet 12a are connected with each other is exposed; thus, a magnetism applying circuit unit 10a is formed.

A threaded hole 22a, securing the opening engaging plate 20 which will be described later, is formed in one side face of the housing 15a, and two threaded holes 31a, for securing the sliding engaging plate 30, are also formed in the other side face. Moreover, in the other magnetism applying circuit unit 10b two threaded holes 21b, for securing the opening engaging plate 20, are formed in one side face of the housing 15a and a threaded hole 32b, for attaching the sliding engaging plate 30, is also formed in the other side face. The threaded hole 32b is provided with a cavity portion around an opening thereof for supporting a top of the sliding engaging plate 30.

The permanent magnets 11a and 12a are Nd—Fe—B magnets having a substantially rectangular parallelepiped shape, and the different polarity faces of the paired permanent magnets 11a and 12a are attached to the respective ends of the yoke 13a. In this manner, the different polarity faces of the permanent magnets 11a and 12a are exposed from the magnetism applying circuit unit 10a. In the present embodiment, the N-polarity side of the permanent magnet 11a is exposed, and the S-polarity side of the permanent magnet 11b is exposed. As described above, the yoke 13a is made of iron, and has permeability. Moreover, the spacer 14a has anon-permeable property, and allows the permanent magnets 11a and 12a to be detained therein against their magnetic attracting force.

The two magnetism applying circuit units 10a and 10b having the above-mentioned construction are aligned face-to-face with each other with the water supply pipe W sandwiched so that the permanent magnets 11a, 12a, 11b and 12b are allowed to be placed close to the peripheral face of the water supply pipe W. In this case, the two magnetism applying circuit units 10a and 10b are placed in such a manner that the permanent magnets, the same polarity sides of which are exposed, are adjacent with each other. In other words, the permanent magnets 11a and 11b are adjacent with each other with the N-polarity side being exposed, and the permanent magnets 12a and 12b are adjacent with each other with the S-polarity side being exposed. The magnetic forces of the permanent magnets 11a, 12a, 11b and 12b are set so that the total number of magnetic flux of the four is, for example, 56,000 Maxwell.

Figure 3:
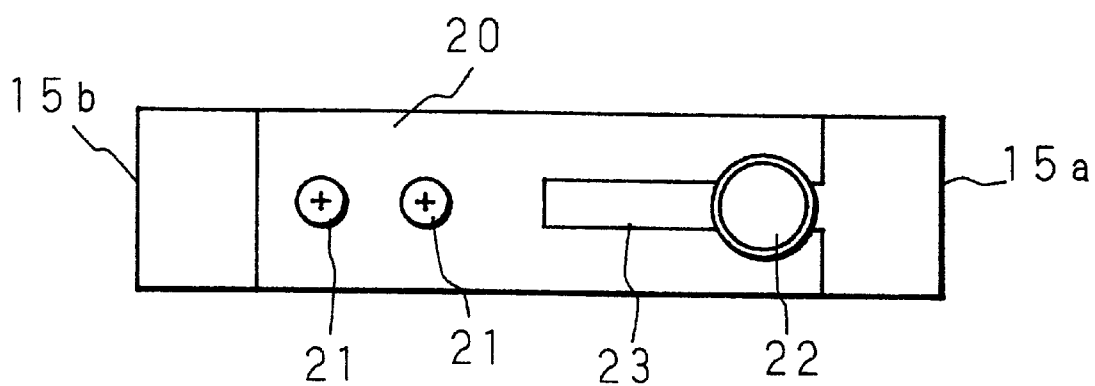
FIG. 3 is a right-side view of FIG. 2.

FIG. 3, which shows the apparatus of FIG. 2 viewed from the right side, indicates the construction of the opening engaging plate. The opening engaging plate 20 is a rectangular plate made of aluminum or a non-permeable material that is extended in one direction, and provided with an opening guide section 23 that is an elongated through hole with an opening at one end, and two through-holes which the rod portions of countersunk head screws 21 are inserted with their heads embedded therein. The width dimension of the opening guide section 23 is set so as to allow the rod section of a fixing bolt 22 to be inserted therein. The rod portion of the fixing bolt 22 is inserted through the opening guide section 23, further inserted into a threaded hole 22a of the housing 15a, and engaged by a screw with its head projecting from the opening guide section 23. Moreover, the countersunk head screws 21 are inserted into threaded holes 21b of the housing 15b through the through holes in the opening engaging plate 20, and engaged by screws.

Figure 4:
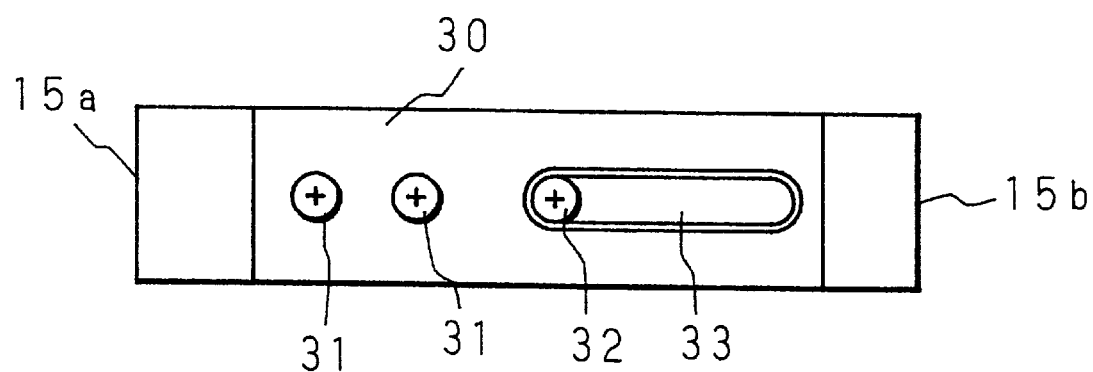
FIG. 4 is a left-side view of FIG. 2.

FIG. 4, which shows the apparatus of FIG. 2 from the left side, indicates the construction of the sliding connecting plate. The sliding engaging plate 30 is a rectangular plate made of aluminum or a non-permeable material that is extended in one direction, and provided with a guide hole 33 that is an elongated through-hole formed in an area extending approximately half the plate in the length direction with a step section, that is a guide groove, formed at the inner, and two through-holes through which the rod portions of countersunk head screws 31 are inserted with their heads embedded therein. The width dimension of the guide hole 33 is set so as to allow the rod portion of a guiding countersunk head screw 32 to be inserted through the guide hole 33, and also to allow the head thereof to be stopped by the guide groove. The guiding countersunk head screw 32 is inserted through the guide hole 33, and further inserted into the threaded hole 32b of the housing 15b, and engaged by a screw. Moreover, the guiding countersunk head screws 31 are inserted into threaded holes 31b of the housing 15a through the through-holes in the sliding engaging plate 30, and engaged by screws.

Figure 5:
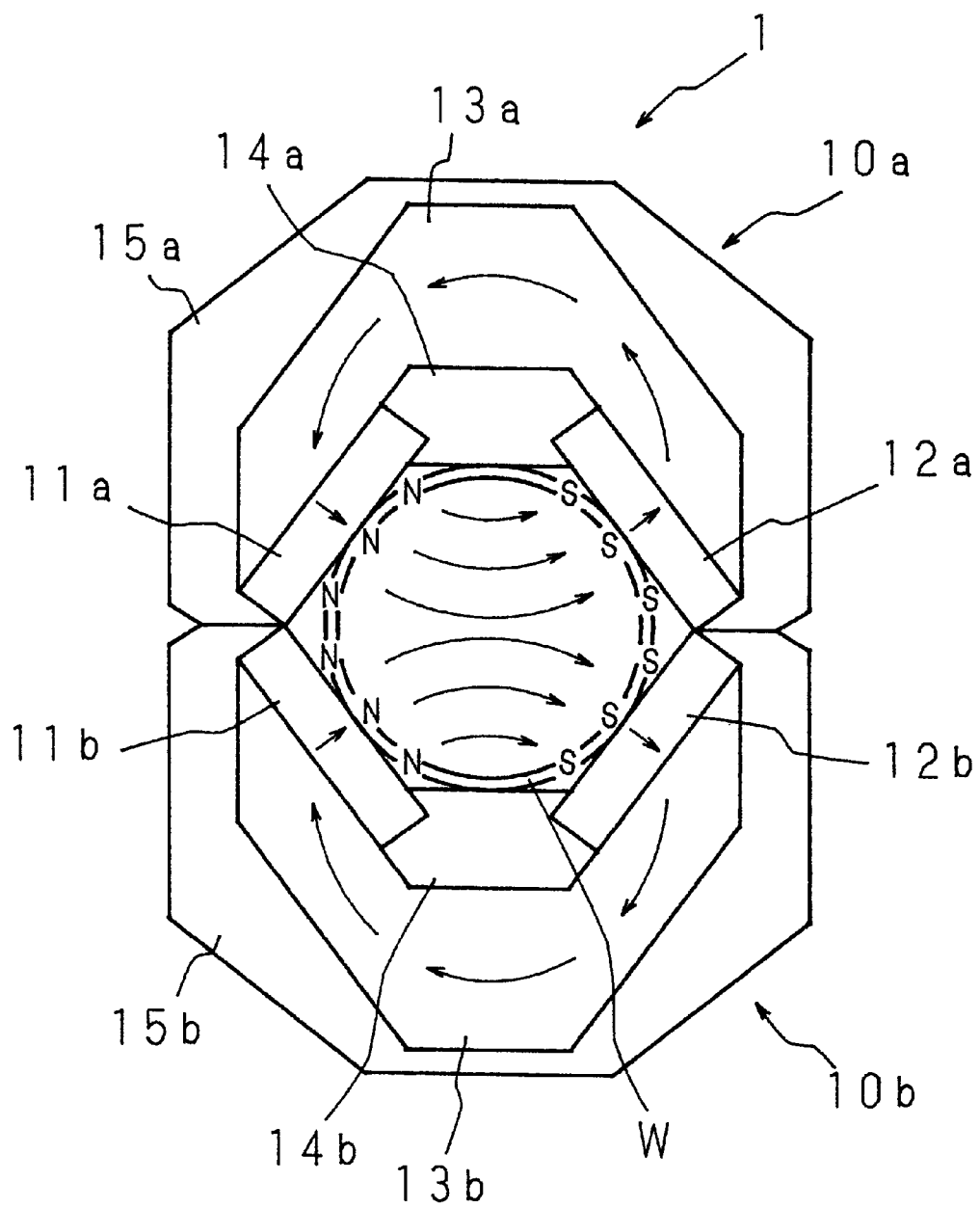
FIG. 5 is an explanatory drawing that shows a flow of a magnetic flux of the first embodiment.

FIG. 5 is an explanatory drawing that shows flows of a magnetic flux generated in the magnetic fluid treatment apparatus 1 having the above-mentioned construction. The two connecting plates 20 and 30 are omitted in FIG. 5. In FIG. 5, arrows indicate flows of the magnetic flux. The magnetic flux, generated from the exposed N-polarity face of the permanent magnet 11a of the magnetism applying circuit unit 10a, enters the water supply pipe W, and is allowed to progress substantially perpendicular to the flowing water inside the water supply pipe W. This magnetic flux flows into the S-polarity face of the permanent magnet 12a of the same magnetism applying circuit unit 10a through the inside of the water supply pipe W, further flows through the yoke 13a, and returns to the permanent magnet 11a. In this manner, the magnetic flux circulates in the magnetism applying circuit unit 10a. The same process takes place also in the other magnetism applying circuit unit 10b. As described above, since the permanent magnets 11a and 12a are connected to the respective ends of the yoke 13a, there is no magnetic field leakage from the yoke 13a. Moreover, the area through which a magnetic permeation path is not formed between the permanent magnets 11a and 12a is only an area inside the water supply pipe W; therefore, no magnetic field leakage takes place outside the water supply pipe W. Furthermore, since the magnetism applying circuit units 10a and 10b having the same construction are placed face-to-face with each other with the water supply pipe sandwiched in between, the magnetic fluxes that have entered the inside of the water supply pipe W are prevented from leaking toward the respective magnetism applying circuit units.

The maximum magnetic force applied to the inside of the water supply pipe W by this apparatus was measured, and the result showed 2800 gauss to 3300 gauss in the case of an iron pipe measuring 20 mm in the outer diameter and 15 mm in the inner diameter. Moreover, in the case of a brass pipe having the same diameters, the result showed 4400 gauss to 4500 gauss. In the case of the conventional apparatus, the maximum value is in the range of 1700 gauss to 1900 gauss in an iron pipe, and 2300 gauss to 2400 gauss in a brass pipe. Therefore, it is confirmed that the present apparatus reduced magnetic field leakage.

Additionally, in the apparatus of the present embodiment, the permanent magnets having 56,000 Maxwell of the total number of magnetic flux are used; however, permanent magnets smaller than these may be adopted for exerting a sufficient magnetic force required for the magnetic treatment on water. Thus, it is possible to miniaturize the apparatus.

Figure 6:
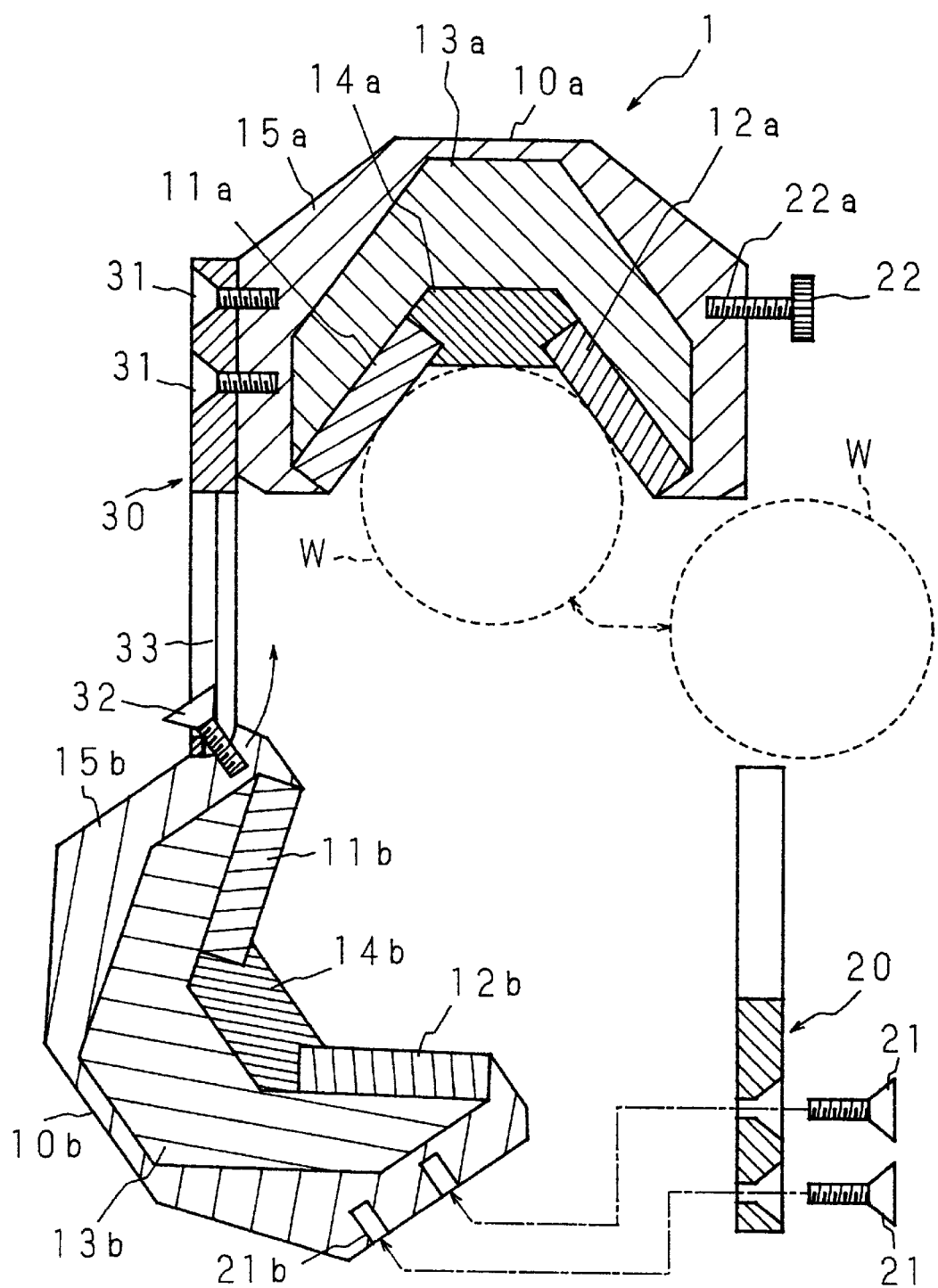
FIG. 6 is an explanatory drawing that shows a state in which the magnetic fluid treatment apparatus of the first embodiment is attached to a water supply pipe.

Next, the following description will discuss sequences of attaching and detaching processes of the present apparatus to the water supply pipe W. FIG. 6 shows a state in which the apparatus is attached to or detached from the pipe. Here, in an actual operation, the present apparatus is shifted toward the water supply pipe W; however, for easy reference to the drawing, the Figure shows a state in which the water pipe W is shifted toward the apparatus 1. First, the sliding engaging plate 30 is engaged to one side of each of the magnetism applying circuit units 10a and 10b, and fastened with screws. In this state, the two magnetism applying circuit units 10a and 10b are coupled into an integral part. Next, the magnetism applying circuit units 10a and 10b are away separated each other. At this time, the guiding countersunk head screw 32 is allowed to shift on the guide hole 33 of the sliding engaging plate 30 in the length direction, with the result that the facing distance between the two units 10a and 10b is widened. On shifting of the guiding countersunk head screw 32 to the most end of the guide hole 33, the magnetism applying circuit unit 10b pivots on the top of the sliding engaging plate 30. By the magnetic repulsive force between the magnetism applying circuit units 10a and 10b, the unit 10b pivots to the direction where the other ends of the two magnetism applying circuit 10a and 10b are opened widely.

The present apparatus is externally placed onto the water supply pipe W from the opening. Then, the opening engaging plate 20 is attached to the magnetism applying circuit unit 10b with the flush screws 21. The fixing bolt 22 has been fastened to the threaded hole 22a of the magnetism applying circuit unit 10a to an extent so as not to slip off. Then, the both of the magnetism applying circuit units 10a and 10b are drawn together, and the rod portion of the fixing bolt 22 is inserted through the opening of the opening guide section 23. The magnetism applying circuit units 10a and 10b are tightened together in accordance with the diameter dimension of the water supply pipe W so as to allow the permanent magnets 11a, 12a, 11b and 12b to place close to the water supply pipe W. At this time, the guiding countersunk head screw 32 is allowed to shift along the guide hole 33 in the length direction of the sliding engaging plate 30, and at the same time, the fixing bolt 22 is allowed to shift along the opening guide section 23 of the opening engaging plate 20 in the length direction, with the result that the facing distance between the two units 10a and 10b is narrowed. Then, the fixing bolt 22 is tightened. Although the magnetism applying circuit units 10a and 10b are subjected to a force that is exerted in the departing direction due to a magnetic repulsive force, The apparatus 1 can be easily installed since the two magnetism applying circuit units 10a and 10b are externally attached to the water supply pipe W in their coupled state.

When the apparatus 1 of the present invention is removed from the water supply pipe W, the sequence of the processes reversed from the above-mentioned processes is carried out. Since the magnetism applying circuit units 10a and 10b are subjected to the magnetic repulsive force in the departing direction from each other, they can be easily removed without their permanent magnets being attracted to the water supply pipe W. In addition, even in the case when two of the sliding connecting plates 30 are attached to both of the ends of the magnetism applying circuit units 10a and 10b, the distance between the magnetism applying circuit units 10a and 10b is adjusted so that they can be attached to a water supply pipe W, that is, for example, a water outlet, having a different diameter dimension.

The magnetic fluid treatment apparatus having the above-mentioned construction was attached to a home-use water supply pipe, and supplied water that had been magnetically treated was examined in its cluster structure. First, measurements were carried out by using a nuclear magnetic resonator (NMR). The TABLE 1 shows the results of the measurements. The NMR is a measuring device which indicates the velocity of water molecules in motion by means of the frequency (Hz). The smaller the numeric value, the faster the motion of the water molecules; and this shows that small clusters having fewer impurities are actively in motion.

As clearly shown by TABLE 1, magnetic water that has been treated by the apparatus of the present invention has a smaller value than that prior to the treatment. In particular, the magnetic water immediately after the treatment showed 60 Hz, which is approximately half the value (125 Hz) prior to the treatment. Therefore, it has been confirmed that the magnetic treatment on supplied water by the use of the present apparatus makes it possible to miniaturize clusters, and consequently to reduce impurities.

Next, water quality tests were carried out on the magnetic water. TABLE 2 shows the results of the tests. Additionally, these tests were carried out based upon the water quality test reports by the water quality test facility. Comparison was made between the magnetic water treated by the apparatus of the present invention and untreated water.

TABLE 2 shows that measured values are small in nitrate-based nitrogen and nitrite-based nitrogen, chlorine ions, organic substances, turbidity, iron and hardness (Ca, Mg) with respect to the magnetic water, as compared with the untreated water. Consequently, it is confirmed that the supplied water subjected to the magnetic treatment by the apparatus of the present invention has a reduction in impurities such as mineral components (Ca, Mg), chlorine ions and organic substances and has scale and sludge eliminated therefrom.

The boiling time of water was measured so as to compare the magnetic water treated by the apparatus of the present invention and the untreated water. The magnetic water and the untreated water (2000 cc, respectively) were heated with an amount of heat of 6500 kcal so as to measure the time it takes to reach respective predetermined water temperatures. TABLE 3 shows the results of the tests.

As shown in TABLE 3, as compared with the untreated water, the magnetic water has shorter times it takes to reach the respective temperatures, and the time it takes to reach boiling is shorter than the untreated water by approximately one minute. This shows that clusters are miniaturized by the magnetic treatment of the apparatus of the present invention, that bonds of excessive organic substances are decomposed so that the thermal conductivity and the interface active function are improved, and that the water molecules are actively in motion.

Moreover, E-260 measurements were carried out on the magnetic water treated by the apparatus of the present invention and the untreated water, and the results show that the value of the E-260 measurements is lower in the magnetic water than in the untreated water. E-260 is an index that indicates the presence of soluble organic substances that are precursors of trihalomethane. Therefore, the magnetic treatment of the present invention decomposes chlorine bonded to organic compounds, thereby suppressing the generation of trihalomethane.

As described above, in the magnetic fluid treatment apparatus of Embodiment 1, magnetic field leakage can be reduced remarkably; therefore, it is possible to allow the magnetism of the permanent magnet to be properly applied to the fluid, and consequently to miniaturize the apparatus. Moreover, since the magnetic field leakage is reduced, it is possible to install the apparatus of the present invention even at a position susceptible to adverse effects from magnetic fields such as that near a meter.

Moreover, since the magnetic applying circuit units are aligned face-to-face so that the same polarity sides of the permanent magnets are located close to each other, the detaching process of the apparatus can be easily carried out by utilizing a magnetic repulsive force exerted between the opposing magnetism applying circuit units.

Because the two magnetism applying circuit units are coupled to each other by using a simple process, and because the attaching and detaching processes are carried out with the two units being coupled to each other, it is possible to easily attach and detach the apparatus.

Moreover, because the slidable connecting plate is used to engage the two magnetism applying circuit units, the apparatus can be applied to water supply pipes having different diameter dimensions.

The magnetic water that has been obtained through the magnetic treatment by the apparatus of the present invention is free from chlorine odor, and less susceptible to adhesion of rust and scale inside the water supply pipe due to the bond of calcium ions; therefore, it is possible to improve the thermal efficiency inside the boiler.

Moreover, the above-mentioned magnetic fluid treatment apparatus is provided with the yoke having an angle of the V-letter shape thereof which has been set in accordance with the shape and the diameter of the water supply pipe to be attached. With this yoke, the paired of permanent magnets spacing is set in accordance with the water supply pipe, as a result, the properly magnetic force can be supplied to the water supply pipe.

Moreover, in the above-mentioned magnetic fluid treatment apparatus, the permanent magnets are placed close to a water supply pipe. In addition, not coming into contact of the exposed surface of the permanent magnets with the water supply pipe prevents a breakage of the permanent magnets. For example, a structure, where an end portion of a panel made of aluminum covering the permanent magnet and the yoke is projecting in a clearance between the permanent magnet and the water supply pipe, allows the realization of the preventing of the crack.

Furthermore, although the above-mentioned magnetic fluid treatment apparatus is provided with the sliding engaging plate having one guide hole, similar effects can be obtained even when two of the guide hole are formed a line in the width direction of the sliding engaging plate. Two guide holes raise the engaging intensity of the magnetism applying circuits. Moreover, the same is true for the screw for fixing the engaging plate. Two screws disposed in a line in the width direction of the engaging plate raise the engaging intensity of the magnetism applying circuits.

Figure 7:
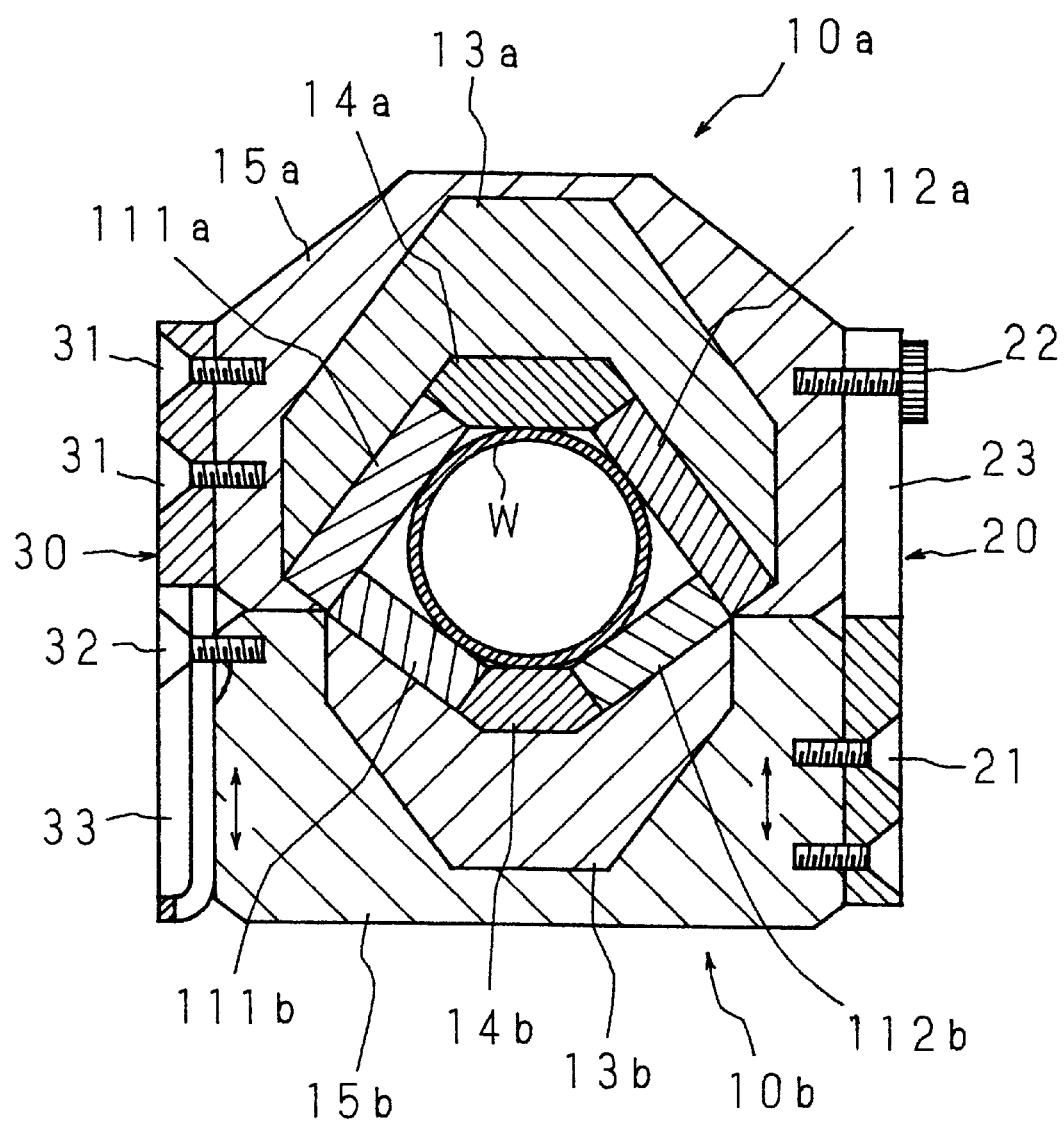
FIG. 7 is a cross-sectional view that shows the construction of a magnetic fluid treatment apparatus in accordance with the second embodiment of the present invention.

Next, an explanation will be given of a magnetic fluid treatment apparatus of a second embodiment of the present invention having a construction that is applicable to water supply pipes with a very small diameter dimension. FIG. 7 is a lateral cross-sectional view that shows the construction of the magnetic fluid treatment apparatus of the second embodiment. Here, two permanent magnets 111a and 112a installed in one of the magnetism applying circuit units 10a have the same dimension. Two permanent magnets 111b and 112b installed in the other magnetism applying circuit unit 10b have the same dimension; however, the length of these permanent magnets 111b and 112b is shorter than that of the permanent magnets 111a and 112a. With this arrangement, when the two magnetism applying circuit units 10a and 10b are aligned face to face with each other, the permanent magnets 111b and 112b having the shorter length are allowed to enter the opposing spaces made by the permanent magnets 111a and 112a having the longer length, thereby making the distance between the permanent magnets smaller. Therefore, in addition to the same effects obtained by the first embodiment, the magnetic fluid treatment apparatus of the second embodiment can be attached to water supply pipes having a very small diameter dimension. Here, because the other constituent parts except the permanent magnets are the same as those of the second embodiment, an explanation thereof is omitted.

Figure 8:
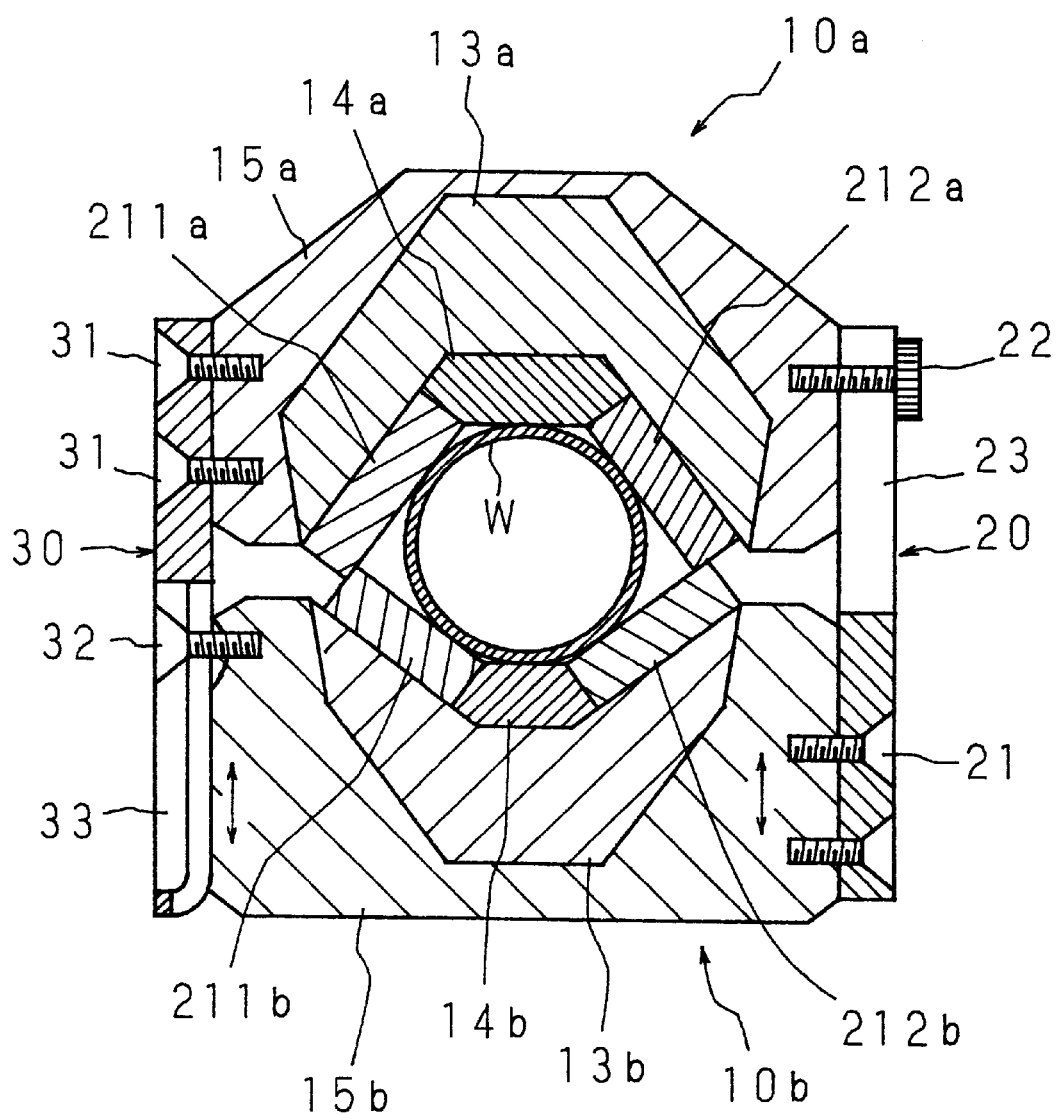
FIG. 8 is a cross-sectional view that shows the construction of a magnetic fluid treatment apparatus in accordance with the third embodiment of the present invention.

An explanation will be given of a third embodiment of the present invention that is also applicable to water supply pipes having a very small diameter dimension. FIG. 8 is a lateral cross-sectional view that shows the construction of the magnetic fluid treatment apparatus of the third embodiment. Two permanent magnets having the same dimension are diagonally arranged with a water supply pipe W interpolated in between. In other words, a permanent magnet 211a and a permanent magnet 212b, which are diagonally located with each other, have the same dimension, and the other permanent magnet 212a and permanent magnet 211b are diagonally located with each other with the length thereof shorter than that of the permanent magnets 211a and 212b. With this arrangement, when the two magnetism applying circuit units 10a and 10b are aligned face-to-face with each other, the permanent magnets 211b and 212a having the shorter length are allowed to enter the opposing spaces made by the permanent magnets 211a and 212b having the longer length, thereby making the distance between the permanent magnets smaller. Therefore, in addition to the same effects obtained by the first embodiment, the magnetic fluid treatment apparatus of the third embodiment can be attached to water supply pipes having a very small diameter dimension. Here, because the other constituent parts except the permanent magnets are the same as those of the first embodiment, an explanation thereof is omitted.

Moreover, the pipe to which the magnetic fluid treatment apparatus is attached is not intended to be limited by a water supply pipe made of iron. For example, even in the case of a water supply pipe made of brass, the same effects can be obtained. Furthermore, the pipe is not intended to be limited by a water supply pipe. For example, the apparatus of the present invention can be attached to a fluid passage pipe for various reaction treatment devices, so as to carry out the magnetic treatment on the fluid flowing through the pipe; in this case also, the same effects are obtained. Furthermore, a magnetic field generated by the apparatus of the present invention may be exerted on fluid as oil, gasoline, natural gas and propane.

Moreover, a plurality of pairs of the magnetism applying circuit units that are aligned face-to-face with each other may be arranged in the pipe length direction, and housed inside a housing.

Furthermore, in the above-mentioned embodiments, explanations have been given of cases in which two magnetism applying circuit units are aligned face-to-face with each other; however, the present invention is not intended to be limited by this arrangement, and one magnetism applying circuit unit may be attached to a pipe in a such manner that permanent magnets are aligned face-to-face with each other in the diameter direction of the pipe. In this arrangement also, it is possible to reduce magnetic field leakage and also to efficiently apply the magnetic force of the permanent magnets to the fluid inside the pipe.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

TABLE 1

| Before treatment | 125 Hz |
|---|---|
| Immediately after treatment | 60 Hz |
| 10 hours later | 60 Hz |
| 24 hours later | 70 Hz |
| 48 hours later | 85 Hz |
| A week later | 100 Hz |
| Two weeks later | 100 Hz |

TABLE 2

| Item | Untreated water Measure value | Magnetic water Measure value | Reference value |
|---|---|---|---|
| General bacteria | Not detected | Not detected | Not more than 100/1 ml |
| Colitis germs | Not detected | Not detected | Not to be detected |
| Nitrate-based nitrogen or Nitrite-based nitrogen | 2.4 | 0.9 | Not more than 10 mg/l |
| Chlorine ions | 29.5 | 12.8 | Not more than 200 mg/l |
| Organic substances | 3.5 | 3.2 | Not more than 10 mg/l |
| PH value | 7.0 | 7.6 | Not less than 5.8 to not more than 8.6 |
| Taste | No abnormality | No abnormality | Not to be abnormal |
| Odor | No abnormality | No abnormality | Not to be abnormal |
| Color degree | 2.3 | 2.0 | Not more than 5 degrees |
| Turbidity | 3 | 0 | Not more than 2 degrees |
| Iron | 0.63 | 0.08 | Not more than 0.3 mg/l |
| Hardness (Ca, Mg) | 76 | 38 | Not more than 300 mg/l |

TABLE 3

| Water temperature | Time Untreated water | Time Magnetic water |
|---|---|---|
| 17.9°C. | 0 sec. | 0 sec. |
| 30.0°C. | 1 min. 36 sec. | 1 min. 22 sec. |
| 40.0°C. | 2 min. 39 sec. | 2 min. 16 sec. |
| 50.0°C. | 3 min. 40 sec. | 3 min. 11 sec. |
| 60.0°C. | 4 min. 49 sec. | 4 min. 07 sec. |
| 70.0°C. | 5 min. 52 sec. | 5 min. 04 sec. |
| 80.0°C. | 7 min. 04 sec. | 6 min. 15 sec. |
| 90.0°C. | 8 min. 28 sec. | 7 min. 29 sec. |
| 100.0°C. | 9 min. 42 sec. | 8 min. 30 sec. |

What is claimed is:

1. A magnetic fluid treatment apparatus comprising:
   two magnetism applying circuits aligned face-to-face with each other, each of the magnetism applying circuits comprising:
      at least a pair of magnetism generating members being placed on the periphery of a pipe, and a pair of magnetism generating members having their different magnetic polarity sides placed close to the pipe; and
      a yoke having permeability, that has ends to which the pair of magnetism generating members are connected
      wherein said apparatus further comprises an alignment means for aligning the two magnetism applying circuits face-to-face with each other with the pipe sandwiched in between so that the magnetism generating members from each circuit have their same magnetic polarity sides located close to each other.

2. The magnetic fluid treatment apparatus according to claim 1, wherein the magnetism generating member generates a magnetic field that is exerted on water flowing through the pipe.

3. The magnetic fluid treatment apparatus according to claim 1, wherein each of the magnetism generating members is a permanent magnet.

4. The magnetic fluid treatment apparatus according to claim 1, further comprising:
   a first engaging portion for engaging the two magnetism applying circuits at respective ends on one side; and
   a second engaging portion for engaging the two magnetism applying circuits at respective ends on the other side.

5. The magnetic fluid treatment apparatus according to claim 4, wherein adjacent magnetism generating members of the opposing magnetism applying circuits have different dimensions from each other.

6. The magnetic fluid treatment apparatus according to claim 1, further comprising:
   a first engaging potion, being attached to respective ends of the two magnetism applying circuits on one side, for engaging the two magnetism applying circuits so as to allow the adjustment of a facing distance between the two magnetism applying circuits; and
   a second engaging portion, being attached to respective ends of the two magnetism applying circuits on the other side, for engaging the two magnetism applying circuits so as to allow the adjustment of a facing distance between the two magnetism applying circuits.

7. The magnetic fluid treatment apparatus according to claim 1, further comprising:
   a first engaging portion, being attached to respective ends of the two magnetism applying circuits on one side, for engaging the two magnetism applying circuits so as to allow the adjustment a facing distance between the two magnetism applying circuits; and a second engaging portion, being attached to respective ends of the two magnetism applying circuits on the other side, for engaging the two magnetism applying circuits so as to allow the removal of one of the magnetism applying circuits from the other.

8. The magnetic fluid treatment apparatus according to claim 1, further comprising:

a first engaging portion being attached to respective ends of the two magnetism applying circuits on one side, and including a fixing section which is fixed to a first of the magnetism applying circuits and a guide section having an elongated hole in the facing direction of the magnetism applying circuits so as to guide a second of the magnetism applying circuits in the length direction of the elongated hole; and a second engaging potion being attached to respective ends of the two magnetism applying circuits on the other side, and including a fixing section which is fixed to the second magnetism applying circuit and a guide section having an elongated hole in the facing direction of the magnetism applying circuits so as to guide the first magnetism applying circuit in the length direction of the elongated hole.

9. The magnetic fluid treatment apparatus according to claim 8, wherein either the first or the second engaging potion is provided with an opening at one end of the elongated hole.

10. The magnetic fluid treatment apparatus according to claim 1, wherein adjacent magnetism generating members of the opposing magnetism applying circuits have different dimensions from each other.

11. A magnetic fluid treatment apparatus comprising:

two magnetic applying circuits aligned face-to-face with each other, each of the magnetism applying circuits comprising:

a yoke having permeability, that has a substantially V-letter shape; and a pair of magnetism generating members having their different magnetic polarity faces connected to the respective ends of the yoke, wherein said apparatus further comprises an alignment means for aligning the two magnetism applying circuits face-to-face with each other so that the magnetism generating members are located inside thereof with the same magnetic polarity sides of the magnetism generating members from each circuit being positioned close to each other.

12. The magnetic fluid treatment apparatus according to claim 11, wherein each of the magnetism generating members is a permanent magnet.

13. The magnetic fluid treatment apparatus according to claim 11, further comprising:

a first engaging potion for engaging the two magnetism applying circuits at respective ends on one side; and a second engaging potion for engaging the two magnetism applying circuits at respective ends on the other side.

14. The magnetic fluid treatment apparatus according to claim 13, wherein adjacent magnetism generating members of the opposing magnetism applying circuits have different dimensions from each other.

15. The magnetic fluid treatment apparatus according to claim 11, wherein adjacent magnetism generating members of the opposing magnetism applying circuits have different dimensions from each other.

16. A magnetic fluid treatment apparatus, comprising:

first and second magnetism applying circuits aligned face-to-face with each other, each of the magnetism applying circuits including:

a yoke having permeability, that has a substantially V-letter shape; and a pair of magnetism generating members having their different magnetic polarity faces connected to the respective ends of the yoke, a spacer having a non-permeable property, for being disposed in a space surrounded by the yoke and the first and the second magnetism generating members, the pair of magnetism applying circuits being aligned face-to-face with each other so that the magnetism generating members are located inside thereof with the same magnetic polarity sides of the both magnetic generating members being positioned close to each other, and a first engaging portion being attached to respective ends of the first and the second magnetism applying circuits on one side, and including a fixing section which is fixed to the first magnetism applying circuit and a guide section having an elongated hole in the facing direction of the magnetism applying circuit so as to guide the second magnetism applying circuit in the length direction of the elongated hole; and a second engaging portion being attached to respective ends of the first and second magnetism applying circuit on the other side, and including a fixing section which is fixed to the second magnetism applying circuit and a guide section having an elongated hole in the facing direction of the magnetism applying circuits with an opening at one end thereof, so as to guide the first magnetism applying circuit in the length direction of the elongated hole.

17. A fluid magnetic treatment apparatus, comprising:

two magnetism applying circuits aligned face-to-face with each other, each of the magnetism applying circuit having at least a pair of magnetism generating members connected by a yoke;

a first engaging portion, being attached to respective ends of the two magnetism applying circuits on one side, for engaging the two magnetism applying circuits so as to allow the adjustment of a facing distance between the two magnetism applying circuits; and a second engaging portion, being attached to respective ends of the two magnetism applying circuits on the other side, for engaging the two magnetism applying circuits so as to allow the adjustment of a facing distance between the two magnetism applying circuits.

* * * * *